United States Patent
Ryu et al.

(10) Patent No.: US 10,020,978 B2
(45) Date of Patent: Jul. 10, 2018

(54) REMOTE USER INTERFACE PROVIDING APPARATUS AND METHOD

(71) Applicant: Samsung Electronics Co., Ltd., Gyeonggi-do (KR)

(72) Inventors: Young-Sun Ryu, Gyeonggi-do (KR); Young-Wan So, Gyeonggi-do (KR)

(73) Assignee: Samsung Electronics Co., Ltd (KR)

( * ) Notice: Subject to any disclaimer, the term of this patent is extended or adjusted under 35 U.S.C. 154(b) by 247 days.

(21) Appl. No.: 13/777,617

(22) Filed: Feb. 26, 2013

(65) Prior Publication Data
US 2013/0227423 A1   Aug. 29, 2013

(30) Foreign Application Priority Data

Feb. 29, 2012   (KR) .................. 10-2012-0021089

(51) Int. Cl.
*G06F 3/00* (2006.01)
*H04L 29/08* (2006.01)

(52) U.S. Cl.
CPC ........ *H04L 29/0809* (2013.01); *H04L 67/025* (2013.01); *H04L 67/306* (2013.01); *H04L 67/36* (2013.01)

(58) Field of Classification Search
CPC ............... G06F 2209/545; G06F 9/542; G06F 17/3056; H04L 29/0809; H04L 67/025; H04L 67/306; H04L 67/36
USPC ....................................................... 715/738
See application file for complete search history.

(56) References Cited

U.S. PATENT DOCUMENTS

| 2004/0060009 A1* | 3/2004 | Jung ............... G11B 20/00159 715/202 |
| 2005/0267972 A1* | 12/2005 | Costa-Requena ....... H04L 67/16 709/227 |
| 2006/0168526 A1* | 7/2006 | Stirbu ...................... G06F 3/14 715/740 |

(Continued)

FOREIGN PATENT DOCUMENTS

KR   1020080058618   6/2008
KR   1020080089134   10/2008

(Continued)

OTHER PUBLICATIONS

European Search Report dated Oct. 7, 2015 issued in counterpart application No. 13755542.1-1853, 6 pages.

(Continued)

*Primary Examiner* — Di Xiao
(74) *Attorney, Agent, or Firm* — The Farrell Law Firm, P.C.

(57) ABSTRACT

A remote User Interface (UI) providing apparatus and method are provided. To this end, a remote UI server generates a profile ID of a remote UI client, and the remote UI client requests and provides a UI by using the generated profile ID. The remote UI server provides generation information for UI generation to the remote UI client, and the remote UI client generates a UI suitable for the remote UI client by using the provided generation information. Thus, the amount of data processed in the remote UI client or the remote UI server and overhead between the remote UI client and the remote UI server are reduced, thereby quickly providing an apparatus-suitable UI.

6 Claims, 9 Drawing Sheets

(56) References Cited

U.S. PATENT DOCUMENTS

| | | | |
|---|---|---|---|
| 2007/0061710 A1* | 3/2007 | Chartier | G06F 17/227 715/234 |
| 2008/0134045 A1* | 6/2008 | Fridman | G06F 8/60 715/735 |
| 2008/0214110 A1 | 9/2008 | Kim et al. | |
| 2008/0243998 A1* | 10/2008 | Oh | G06F 3/0482 709/203 |
| 2009/0228439 A1* | 9/2009 | Manolescu | G06F 17/30864 |
| 2009/0265648 A1 | 10/2009 | Ryu et al. | |
| 2009/0288439 A1* | 11/2009 | Ihle | B01D 35/30 62/317 |
| 2010/0257455 A1 | 10/2010 | Park et al. | |
| 2011/0060999 A1* | 3/2011 | So | G06F 9/4445 715/740 |
| 2011/0113088 A1* | 5/2011 | Seo | G06F 9/542 709/203 |
| 2011/0138290 A1* | 6/2011 | Park | H04L 12/2809 715/734 |
| 2011/0264753 A1 | 10/2011 | Park et al. | |
| 2012/0302346 A1* | 11/2012 | Layne, IV | A63F 13/79 463/36 |
| 2013/0055303 A1* | 2/2013 | Kannan | H04L 41/0893 725/25 |
| 2013/0219024 A1* | 8/2013 | Flack | H04L 67/2804 709/219 |
| 2014/0195546 A1* | 7/2014 | Ren | G06F 17/30867 707/748 |
| 2014/0215306 A1* | 7/2014 | Chiculita | G06F 17/248 715/234 |

FOREIGN PATENT DOCUMENTS

| | | |
|---|---|---|
| KR | 1020090110199 | 10/2009 |
| KR | 1020100110079 | 10/2010 |

OTHER PUBLICATIONS

Korean Office Action dated Feb. 8, 2018 issued in counterpart application No. 10-2012-0021089, 11 pages.

* cited by examiner

REMOTE USER INTERFACE PROVIDING APPARATUS AND METHOD

PRIORITY

This application claims priority under 35 U.S.C. § 119(a) to a Korean Patent Application filed in the Korean Intellectual Property Office on Feb. 29, 2012 and assigned Serial No. 10-2012-0021089, the entire disclosure of which is hereby incorporated by reference.

BACKGROUND OF THE INVENTION

1. Field of the Invention

The present invention generally relates to a remote user interface providing apparatus and method, and more particularly, to an apparatus and method for providing a remote user interface which is suitable for a capability of an apparatus.

2. Description of the Related Art

Generally, a remote user interface is provided with a user interface from a remote apparatus and shows the user interface to a user to allow the user to control the remote apparatus.

An apparatus for providing a user interface which executes such a technique, a remote user interface server, and an apparatus (a remote user interface client) which is provided with the user interface, perform a process of matching capabilities therebetween to determine whether the user interface can be processed.

To be more specific, the remote user interface server (hereinafter, a remote UI server) forwards a user interface list (hereinafter, a UI list) including profiles of a plurality of user interfaces (hereinafter, UIs) and information about video profiles to the remote user interface client (hereinafter, a remote UI client). The remote UI client, upon receiving the UI list, performs profile matching if there is a selection of a UI, to identify the profile of the selected UI and a video profile supported in the remote UI client, and forwards a UI request, together with an identifying result, to the remote UI server. The remote UI server, upon receiving the request and result, performs profile matching to identify the profile of the UI selected in the remote UI client and the video profile supported in the remote UI client, and selects a video profile which can be supported in the remote UI server. Thereafter, the remote UI server forwards the UI optimized for the remote UI client to the remote UI client by using the selected video profile. If there is a request for a new UI, the remote UI server and the remote UI client perform the foregoing process in the same manner as described above.

As such, conventionally, to provide a UI, the remote UI server and the remote UI client perform profile matching to identify a video profile supported in the remote UI client and a video profile supported in the remote UI server, and provide a UI according to the identified results.

However, in this case, the remote UI server needs to prepare for UI profiles and video profiles for various remote UI clients and has to perform profile matching several times, increasing the overhead of the remote UI server.

Moreover, the remote UI client has to transmit client information such as a UI profile, a video profile, and an apparatus profile, each time when sending a request for a UI to the remote UI server.

SUMMARY OF THE INVENTION

Accordingly, the present invention has been made to address at least the problems and disadvantages described above, and to provide at least the advantages below. Accordingly, an aspect of the present invention provides a remote UI providing apparatus and method for reducing overhead between a remote UI client and a remote UI server.

According to an aspect of the present invention, there is provided a remote User Interface (UI) providing apparatus including a browser for receiving, rendering and displaying a UI, a profile ID processor for storing a profile ID of the remote UI providing apparatus upon receiving the profile ID of the remote UI providing apparatus together with the UI, and a controller for forwarding a request for a new UI to a remote UI server upon receiving the request for the new UI and controlling the browser to display the received UI.

According to an aspect of the present invention, there is provided a User Interface (UI) providing method in a remote UI providing apparatus, the UI providing method including a receiving a profile ID of the remote UI providing apparatus, together with a UI, rendering and displaying the received UI, storing the profile ID of the remote UI providing apparatus; and forwarding a request for a new UI to a remote UI server upon receiving the request for the new UI.

According to another aspect of the present invention, there is provided a remote UI providing apparatus including a browser for receiving a request for a UI and forwarding the UI to a remote UI client, a profile ID generator for generating a profile ID of the remote UI client, upon receiving a profile of the remote UI client, together with the request for the UI, from the remote UI client, and a controller for generating the UI in response to the request and forwarding the profile ID, together with the generated UI, to the remote UI client.

According to an aspect of the present invention, there is provided a User Interface (UI) providing method in a remote UI providing apparatus, the UI providing method including a receiving a profile of a remote UI client, together with a request for a UI, from the remote UI client, generating the UI in response to the request, generating a profile ID of the remote UI client; and forwarding the profile ID, together with the generated UI, to the remote UI client.

According to another aspect of the present invention, there is provided a remote UI providing apparatus including a browser for rendering and displaying a UI, a UI generator for generating the UI by using UI generation information, which is received from a remote UI server, and a controller for forwarding a request for a UI to the remote UI server and controlling the browser to display the generated UI.

According to a further aspect of the present invention, there is provided a User Interface (UI) providing method in a remote UI providing apparatus, the UI providing method including forwarding a request for a UI to the a remote UI server, receiving UI generation information used for generation of the UI received from the remote UI server, generating the UI for the remote UI providing apparatus by using the UI generation information, and displaying the generated UI.

BRIEF DESCRIPTION OF THE DRAWINGS

The above and other features and advantages of embodiments of the present invention will be more apparent from the following detailed description taken in conjunction with the accompanying drawings, in which.

DETAILED DESCRIPTION OF EMBODIMENTS OF THE PRESENT INVENTION

Hereinafter, embodiments of the present invention will be described with reference to the accompanying drawings. A detailed description of well-known functions and constructions will not be provided if they unnecessarily obscure the subject matter of the present invention.

According to an embodiment of the present invention, a remote UI client forwards a profile thereof, together with a UI request, to a remote UI server, and the remote UI server generates a profile ID of the remote UI client and forwards the profile ID to the remote UI client, such that the remote UI client, when sending a new UI request, forwards the generated profile ID together with the new UI request, thereby reducing the overhead of the remote UI client which forwards a large amount of data each time when sending a UI request.

According to an embodiment of the present invention, if a remote UI client sends a UI request, a remote UI server generates a general-purpose UI including UI generation information used for UI generation and forwards the general-purpose UI to the remote UI client, and the remote UI client generates a UI suitable for the remote UI client by using the UI generation information included in the general-purpose UI, thereby reducing the number of profile matching processes executed several times and reducing the amount of data communicated between the server and the client.

First, referring to FIGS. 1 through 4, remote UI providing apparatus and method according to a first embodiment of the present invention will be described.

Figure 1:
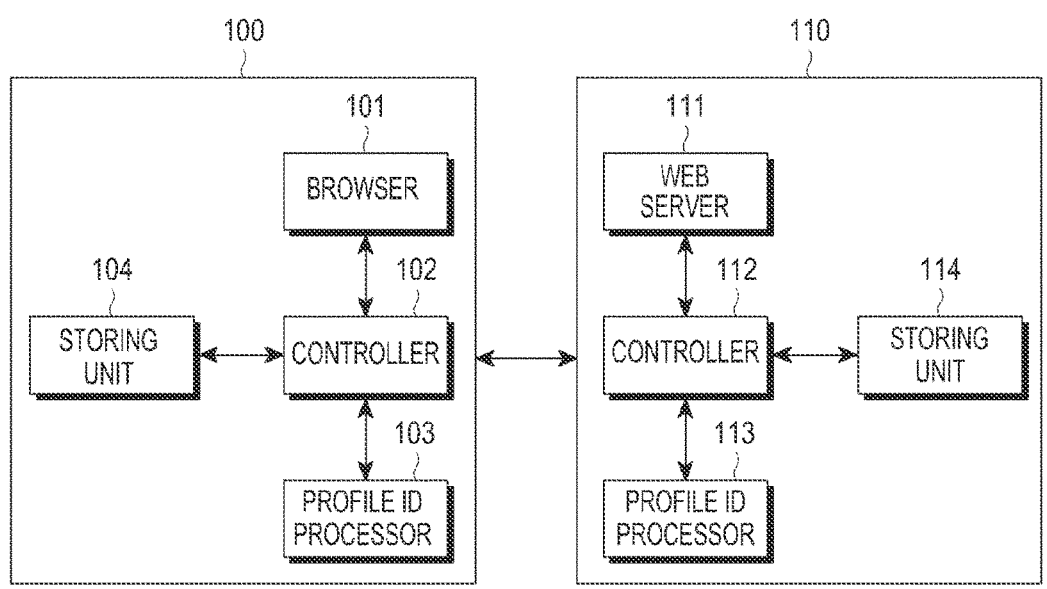
FIG. 1 illustrates a block diagram of remote UI providing apparatuses according to an embodiment of the present invention.

FIG. 1 illustrates a block diagram of remote UI providing apparatuses according to the first embodiment of the present invention.

In the first embodiment of the present invention, the remote UI providing apparatuses include a remote UI client 100 and a remote UI server 110.

The remote UI client 100 includes a browser 101, a controller 102, a profile ID processor 103, and a storing unit 104.

The browser 101 sends a request for a UI list or a UI to the remote UI server 110 under control of the controller 102, and renders and displays the UI list or UI received from the remote UI server 110.

The controller 102, upon receiving a request for UI selection from a user, forwards a request for a UI list of at least one UI to the remote UI server 110 through the browser 101. Upon receiving the UI list from the remote UI server 110, the controller 102 renders and displays the UI list received through the browser 101.

If there is selection of any one UI from the displayed UI list, the controller 102 forwards a request for the selected UI to the remote UI server 110 through the browser 101. The controller 102 performs profile matching to identify a UI profile and a video profile supported in the remote UI client 100, and forwards the identified profiles, together with the request, to the remote UI server 110. Upon receiving a profile ID for the remote UI client 100 together with the requested UI from the remote UI server 110, the controller 102 renders and displays the received UI through the browser 101. Herein, the profile ID means temporary string information about the remote UI client 100.

If there is a request for a new UI, the controller 102 forwards the request for the new UI, together with the profile ID, to the remote UI server 110 through the browser 101. The profile ID processor 103 stores the profile ID of the remote UI client 100 received through the browser 101 in the storing unit 104.

If there is the request for the new UI, the profile ID processor 103 determines whether the stored profile ID is reusable; if the stored profile ID is reusable, the profile ID processor 103 forwards the profile ID to the controller 102.

If the profile ID is not reusable, the profile ID processor 103 does not forward the profile ID to the controller 102 and forwards the request for the new UI, together with the UI profile and the video profile supported in the remote UI client 100, to the remote UI server 110 through the browser 101. The storing unit 104 stores the UI profile and the video profile which are supported in the remote UI client 100, and a profile of the apparatus. The storing unit 104 also stores the UI list and the UI received from the remote UI server 110 and stores the profile ID of the remote UI client 100.

The remote UI server 110 includes a web server 111, a controller 112, a profile ID generator 113, and a storing unit 114.

The web server 111 receives a request for a UI list or a UI from the remote UI client 100, and forwards the requested UI list or UI to the remote UI client 100. The controller 112, upon receiving the request for the UI list through the web server 111, generates a list of at least one UI and forwards the generated UI list to the remote UI client 100 through the web server 111.

If the request for the UI is received, together with the UI profile and the video profile supported in the remote UI client 100, from the remote UI client 100, the profile ID generator 113 generates a profile ID of the remote UI client 100 which corresponds to the received UI profile and video profile. The profile ID generator 113 forwards the requested UI, together with the generated profile ID of the remote UI client 100, to the remote UI client 100 through the web server 111. Thereafter, the profile ID generator 113 stores the generated profile ID of the remote UI client 100, together with the UI profile and the video profile, in the storing unit 114.

If a request for a new UI is received, together with a profile ID, from the remote UI client 100, the profile ID generator 113 identifies a UI profile and a video profile of the remote UI client 100 corresponding to the received profile ID, generates the requested UI according to the identified result, and forwards the generated UI to the remote UI client 100 through the web server 111.

The storing unit 114 stores the UI profile and video profile of the remote UI client 100 and the profile ID generated to correspond to the UI profile and video profile of the remote UI client 100. The storing unit 114 also stores a UI list of a plurality of UIs.

As such, the present invention may quickly provide an apparatus-suitable UI while reducing overhead between the remote UI client and the remote UI server.

Figure 2:
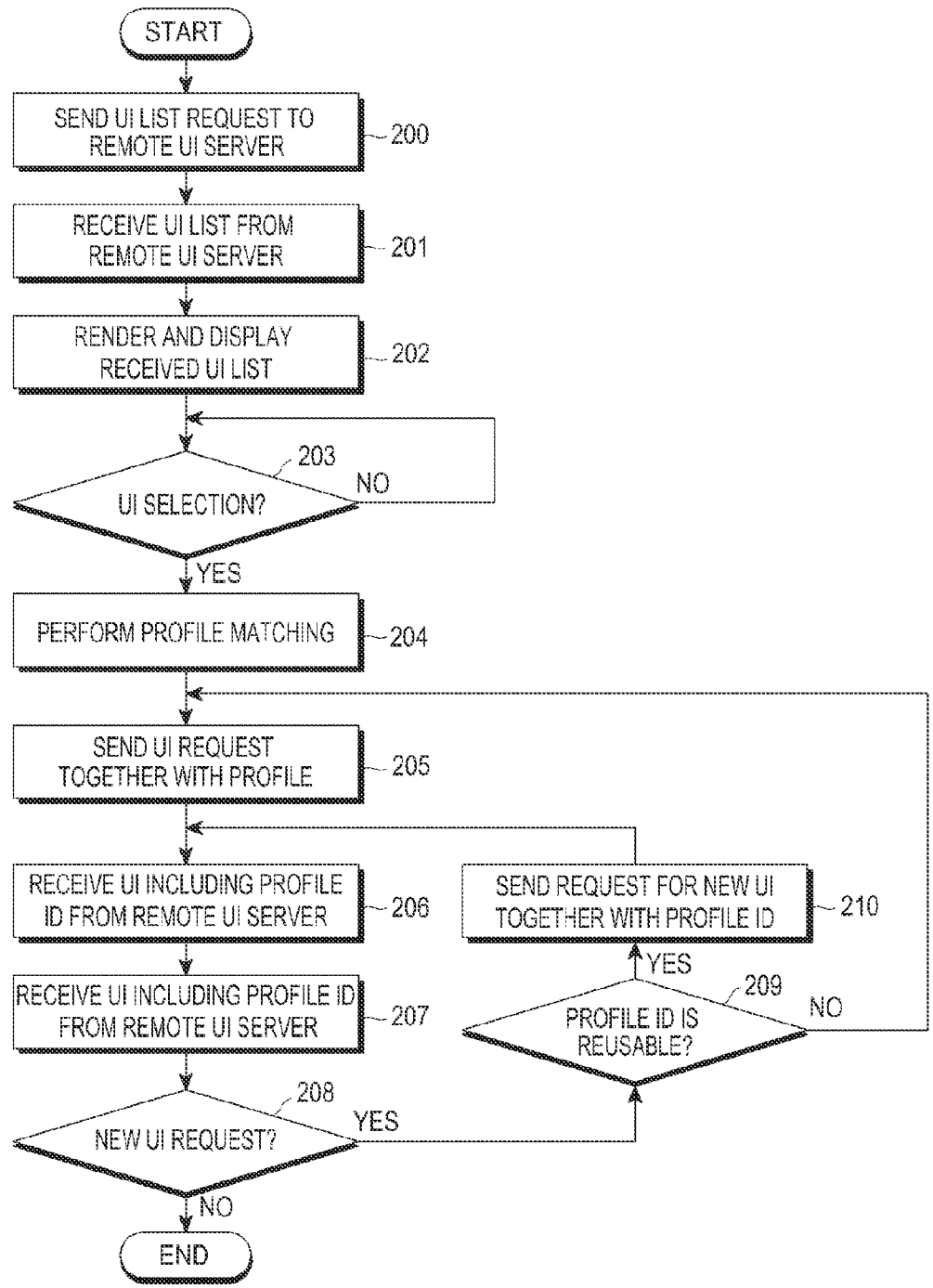
FIG. 2 is a flowchart illustrating a UI providing process at a remote UI client according to an embodiment of the present invention.

FIG. 2 is a flowchart illustrating a UI providing process at a remote UI client according to the first embodiment of the present invention.

In step 200, the remote UI client 100 sends a UI list request for UI selection to the remote UI server 110. In step 201, the remote UI client 100 receives the requested UI list from the remote UI server 110. In step 202, the remote UI client 100 renders and displays the received UI list.

In step 203, the remote UI client 100 determines whether there is a UI selection; if there is a UI selection, the remote UI client 100 goes to step 204, and if there is no UI selection, the remote UI client 100 continuously determines whether there is a UI selection in step 203.

In step 204, the remote UI client 100 performs profile matching More specifically, the remote UI client 100 performs profile matching to identify a UI profile and a video profile supported in the remote UI client 100. In step 205, the remote UI client 100 forwards a UI request, together with the identified UI profile and video profile, to the remote UI server 110. In this case, the remote UI client 100 forwards the profiles through a user-agent header of HTTP.

In step 206, the remote UI client 100 receives a UI, together with a profile ID of the remote UI client 100, from the remote UI server 110. In step 207, the remote UI client 100 renders and displays the received UI and stores the received profile ID.

In step 208, the remote UI client 100 determines whether there is a request for a new UI; if there is the request for the new UI, the remote UI client 100 goes to step 209, and if there is no request for the new UI, the remote UI client 100 terminates the UI providing process. The remote UI client 100 makes a determination by determining whether the request is a request for a new UI described in the UI list received from the remote UI server 110, a request for a sub UI of an already used UI, or a request for a resource such as an image, video, audio, a java script, or a Cascading Style Sheet (CSS) for configuring the UI.

In step 209, the remote UI client 100 determines whether a profile ID of the new UI request is reusable; if the profile ID is reusable, the remote UI client 100 goes to step 210, and if the profile ID is not reusable, the remote UI client 100 goes to step 205 to forward the new UI request, together with the identified UI profile and video profile, to the remote UI server 110 and proceed to steps 206 through 210.

In step 210, the remote UI client 100 forwards the new UI request, together with the profile ID, to the remote UI server 110, and performs steps 206 through 210.

Figure 3:
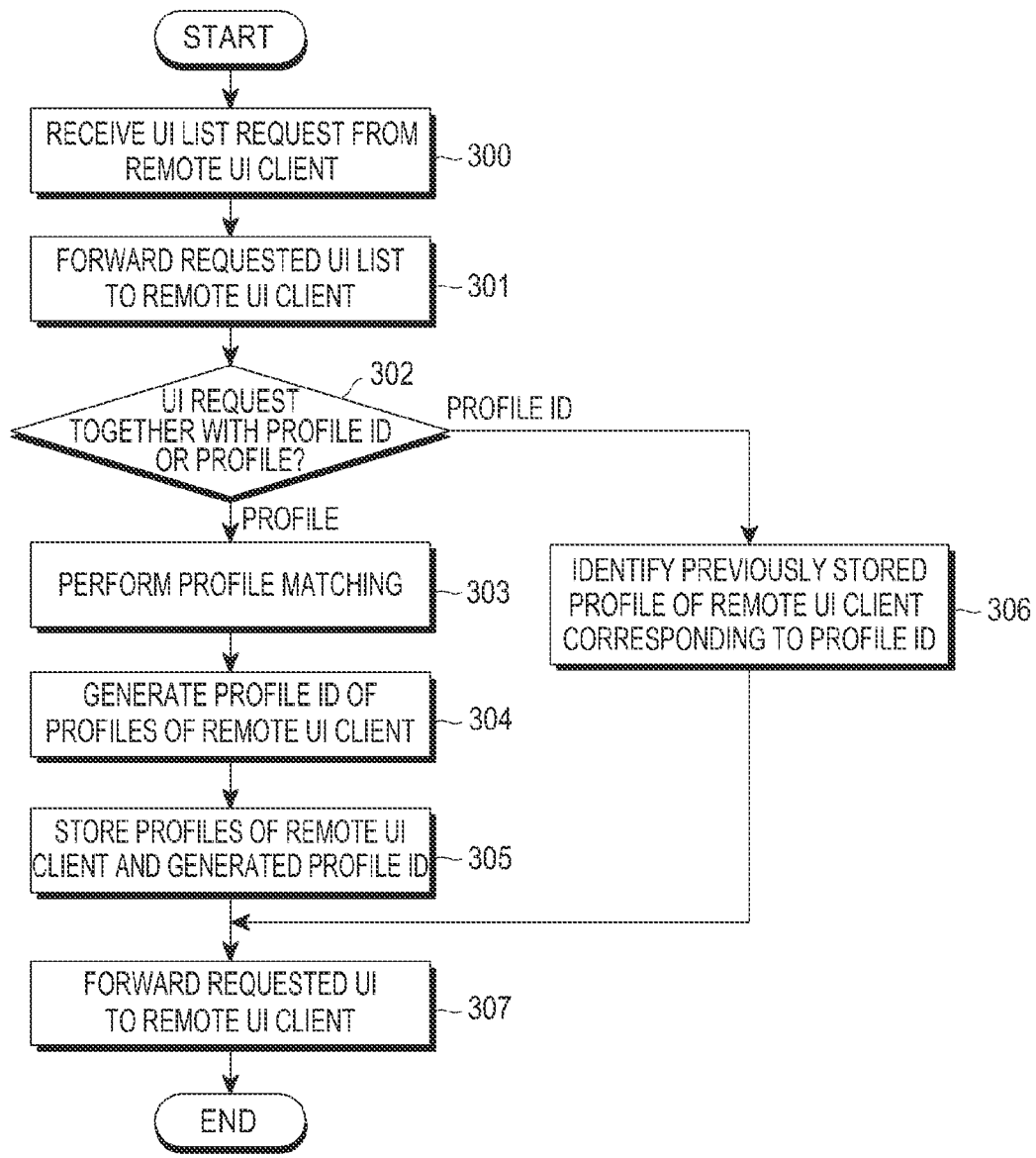
FIG. 3 is a flowchart illustrating a UI providing process at a remote UI server according to an embodiment of the present invention.

FIG. 3 is a flowchart illustrating a UI providing process at the remote UI server 110 according to the first embodiment of the present invention.

In step 300, the remote UI server 110 receives a request for a UI list from the remote UI client 100. In step 301, the remote UI server 110 forwards the requested UI list to the remote UI client 100.

In step 302, the remote UI server 110 determines whether a UI request is received together with a profile ID or a profile. If the UI request is received together with the profile, the remote UI server 110 goes to step 303; if the UI request is received together with the profile ID, the remote UI server 110 goes to step 306 to identify a previously stored profile of the remote UI client 100 which corresponds to the profile ID.

In step 303, the remote UI server 110 performs profile matching More specifically, the remote UI server 110 identifies a video profile which can also be supported in the remote UI client 100 among video profiles supported in the remote UI server 110.

In step 304, the remote UI server 110 generates a profile ID of the profiles of the remote UI client 100. In step 305, the remote UI server 110 stores the generated profile ID together with the profiles of the remote UI client 100. In step 307, the remote UI server 110 generates a UI according to the identifying result and forwards the generated UI to the remote UI client 100.

In this way, the present invention may quickly provide an apparatus-suitable UI while reducing overhead between the remote UI client and the remote UI server.

Figure 4:
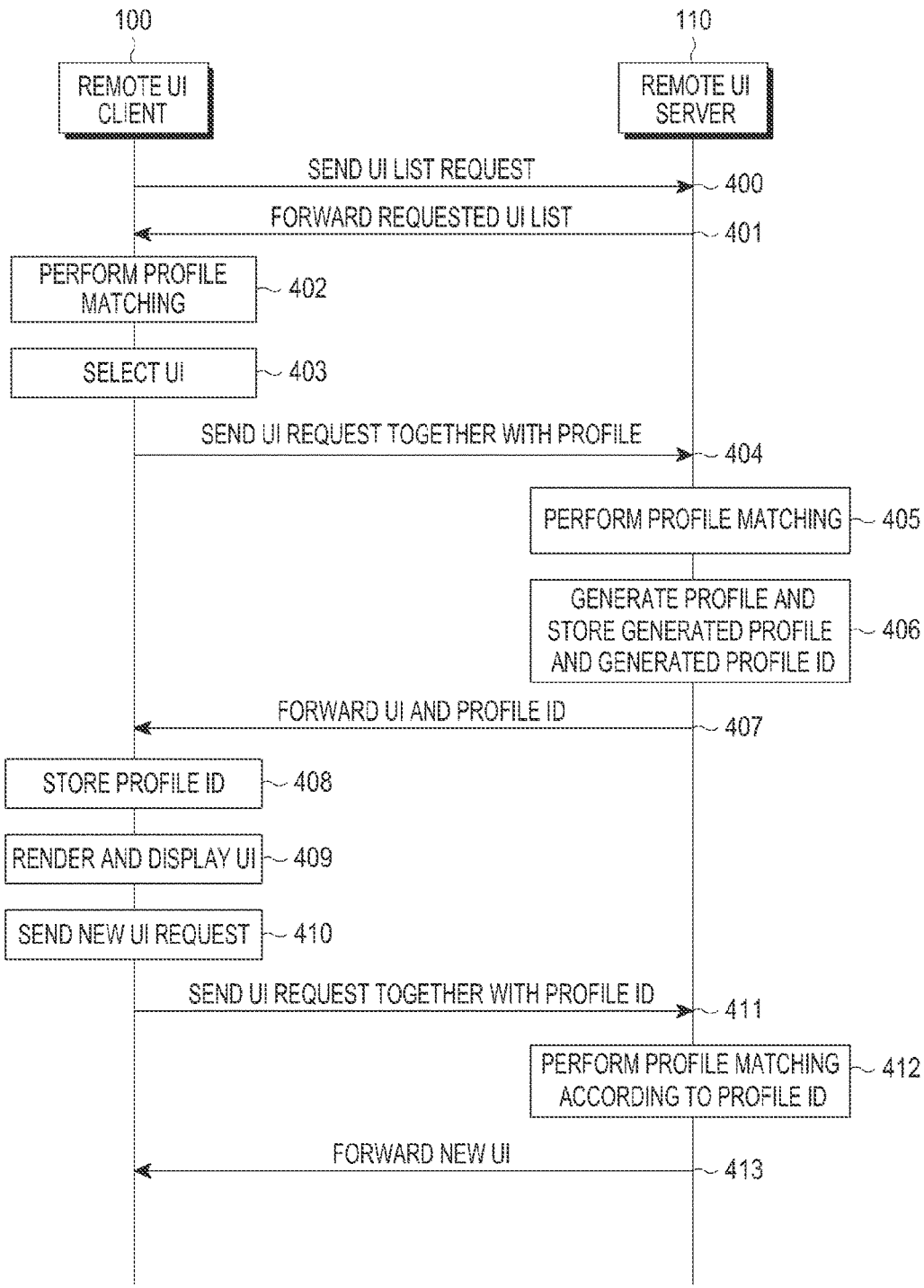
FIG. 4 is a signal flow diagram illustrating a UI providing process between the remote UI client and the remote UI server according to an embodiment of the present invention.

FIG. 4 is a signal flow diagram illustrating a UI providing process between the remote UI client 100 and the remote UI server 110 according to the first embodiment of the present invention.

In step 400, the remote UI client 100 sends a request for a UI list to the remote UI server 110. In step 401, the remote UI server 110 forwards the requested UI list to the remote UI client 100.

In step 402, the remote UI client 100 performs profile matching to identify a UI profile and a video profile which can be supported in the remote UI client 100. If there is a UI selection in step 403, the remote UI client 100 forwards the UI request, together with the identified profiles, to the remote UI server 110 in step 404.

In step 405, the remote UI server 110 identifies a video profile which can be supported in the remote UI server 110 among the received profiles supported in the remote UI client 100 and performs profile matching to generate a UI according to the identified result.

In step 406, the remote UI server 110 generates a profile ID of the received profiles and stores the generated profile ID together with the received profiles.

In step 407, the remote UI server 110 forwards the profile ID, together with the generated UI, to the remote UI client 100.

In step 408, the remote UI client 100 stores the received profile ID. In step 409, the remote UI client 100 renders and displays the received UI.

If there is a request for a new in step 410, the remote UI client 100 forwards the new UI request, together with the profile ID, to the remote UI server 110 in step 411 if a profile ID of the new UI is reusable.

In step 412, the remote UI server 110 performs profile matching according to the profile ID. In this step, the remote UI server 110 identifies a previously stored profile of the remote UI client 100 and generates a new UI according to the identified result. In step 413, the remote UI server 110 forwards the generated new UI to the remote UI client 100.

As such, the present invention may quickly provide an apparatus-suitable UI while reducing overhead between the remote UI client and the remote UI server.

With reference to FIGS. 5 through 9, a description will be made of a remote UI providing apparatus and method according to a second embodiment of the present invention.

Figure 5:
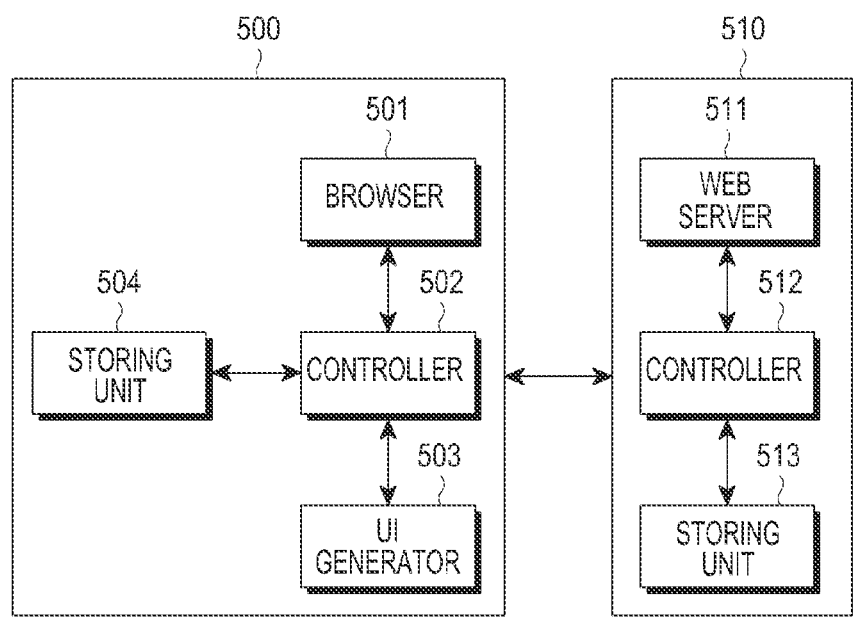
FIG. 5 illustrates a block diagram of remote UI providing apparatuses according to an embodiment of the present invention.

FIG. 5 illustrates a block diagram of remote UI providing apparatuses according to the second embodiment of the present invention.

The remote UI providing apparatuses according to the second embodiment of the present invention include a remote UI client 500 and a remote UI server 510.

The remote UI client 500 includes a browser 501, a controller 502, a UI generator 503, and a storing unit 504. The browser 501 sends a request for a UI list or a UI to the remote UI server 510 and renders and displays the UI list or UI received from the remote UI server 510, under control of the controller 502.

The controller 502, upon receiving a request for UI selection from the user, forwards the request for the UI list of at least one UI to the remote UI server 510 through the browser 501. Upon receiving the UI list from the remote UI server 510, the controller 502 renders and displays the received UI list through the browser 501.

If there is selection of any one UI from the displayed UI list, the controller 502 forwards a request for the selected UI to the remote UI server 510 through the browser 501.

If a general-purpose UI is received from the remote UI server 510 in response to the UI request, the UI generator 503 generates a UI suitable for the remote UI client 500 by using UI generation information included in the received general-purpose UI. The UI generation information is information used to generate a UI suitable for the remote UI client 500, and includes UI configuration information in which configuration data of a general UI which is applicable to any apparatus is described, such as a HyperText Markup Language (HTML), and UI rule information for application of a UI according to a UI profile and an apparatus capability, such as Cascading Style Sheets (CSS).

More specifically, the UI generator 503 identifies profile information such as a UI profile, a video profile, and an apparatus profile for the remote UI client 500, which are previously stored in the storing unit 504, and detects UI generation information corresponding to the identified profile information. For example, the UI generator 503 identifies the UI profile and the video profile of the remote UI client 500 to detect UI configuration information for configuring a UI suitable for the remote UI client 500, and UI rule information for application to the UI. The UI generator 503 generates a UI to which the detected UI configuration information and UI rule information are applied.

The UI generator 503 renders and displays the generated UI through the browser 501. The storing unit 504 stores the UI profile, the video profile, and the apparatus profile of the remote UI client 500, and stores the general-purpose UI received from the remote UI server 510.

The remote UI server 510 includes a web server 511, a controller 512, and a storing unit 513.

The web server 511 receives a request for a UI list or a UI from the remote UI client 500, and forwards the requested UI list or a general-purpose UI to the remote UI client 500.

The controller 512, upon receiving the request for the UI list through the web server 511, generates a UI list of at least one UI, and forwards the generated UI list to the remote UI client 500 through the web server 511. The controller 512, upon receiving the request for the UI through the web server 511, forwards a general-purpose UI including UI generation information, which includes UI configuration information in which configuration data of a general UI which is applicable to any apparatus is described, such as an HTML, and UI rule information for application of a UI according to a UI profile and an apparatus capability, such as CSS, to the remote UI client 500.

The storing unit 513 stores the general-purpose UI including the UI generation information which includes UI configuration information in which configuration data of a general UI which is applicable to any apparatus is described, such as an HTML, and UI rule information for application of a UI according to a UI profile and an apparatus capability, such as CSS.

In this way, the present invention may quickly provide an apparatus-suitable UI while reducing overhead between the remote UI client and the remote UI server.

Figure 6:
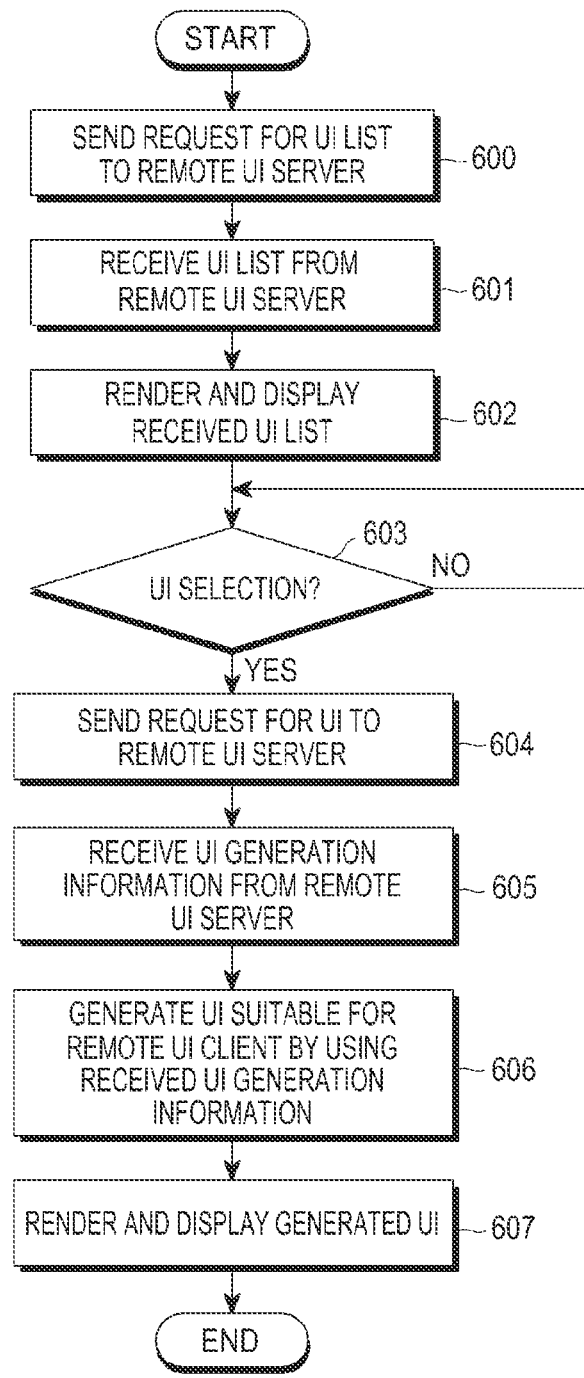
FIG. 6 is a flowchart illustrating a UI providing process at a remote UI client according to an embodiment of the present invention.

FIG. 6 is a flowchart illustrating a UI providing process at the remote UI client 500 according to the second embodiment of the present invention.

In step 600, the remote UI client 500 sends a request for a UI list for UI selection to the remote UI server 510. In step 601, the remote UI client 500 receives the requested UI list from the remote UI server 510. In step 602, the remote UI client 500 renders and displays the received UI list.

In step 603, the remote UI client 500 determines whether there is a UI selection. If there is a UI selection, the remote UI client 500 goes to step 604; otherwise, if there is no UI selection, the remote UI client 500 continuously determines whether there is a UI selection in step 603.

In step 604, the remote UI client 500 forwards the UI request to the remote UI server 510. In step 605, the remote UI client 500 receives a general-purpose UI including UI generation information from the remote UI server 510. The UI generation information includes UI configuration information in which configuration data of a general UI which is applicable to any apparatus is described, such as an HTML, and UI rule information for application of a UI according to a UI profile and an apparatus capability, such as CSS.

In step 606, the remote UI client 500 generates a UI suitable for the remote UI client 500 by using the received UI generation information. For example, if the remote UI client 500 has a screen size of 1280 pixels by 960 pixels and can reproduce video of a file having an extension 'mpeg', the remote UI client 500 generates a UI which has a screen configuration of 1280 pixels by 960 pixels and can reproduce video of a file having an extension 'mpeg'. Since the UI generation information includes configuration data of a general UI which is applicable to any apparatus and UI rule information for application of a UI according to a UI profile which the remote UI client 500 can support and an apparatus capability, such UI generation is possible.

In step 607, the remote UI client 500 renders and displays the generated UI through the browser 501 and terminates the UI providing process.

Figure 7:
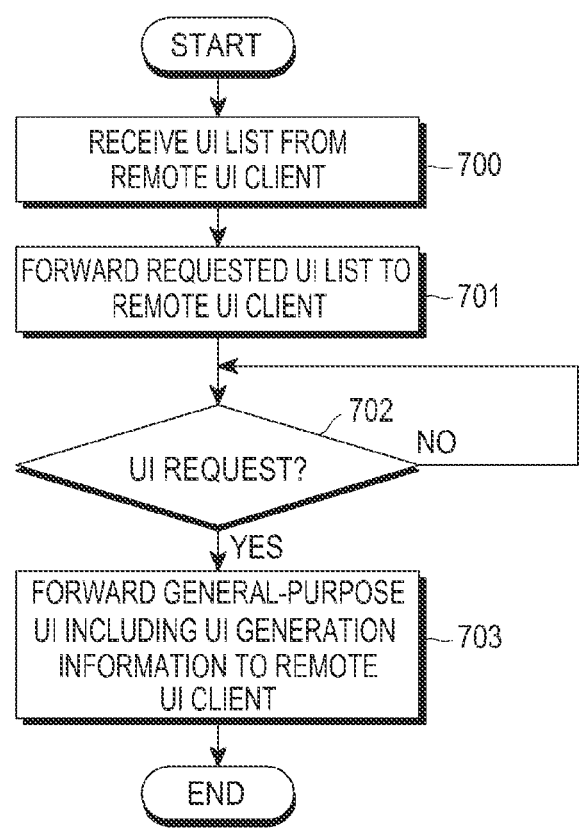
FIG. 7 is a flowchart illustrating a UI providing process at a remote UI server according to an embodiment of the present invention.

FIG. 7 is a flowchart illustrating a UI providing process at the remote UI server 500 according to the second embodiment of the present invention.

In step 700, the remote UI server 510 receives a request for a UI list from the remote UI client 500. In step 701, the remote UI server 510 forwards the requested UI list to the remote UI client 500.

In step 702, the remote UI server 510 determines whether there is a request for a UI; if so, the remote UI server 510 goes to step 703 and if not, the remote UI server 510 continuously determines whether there is a UI request in step 702.

In step 703, the remote UI server 510 forwards a general-purpose UI including UI generation information to the remote UI client 500 and terminates the UI providing process. The UI generation information includes UI configuration information in which configuration data of a general UI which is applicable to any apparatus is described, such as an HTML, and UI rule information for application of a UI according to a UI profile and an apparatus capability, such as CSS, to the remote UI client 500.

As such, the present invention may quickly provide an apparatus-suitable UI while reducing overhead between the remote UI client and the remote UI server.

Figure 8:
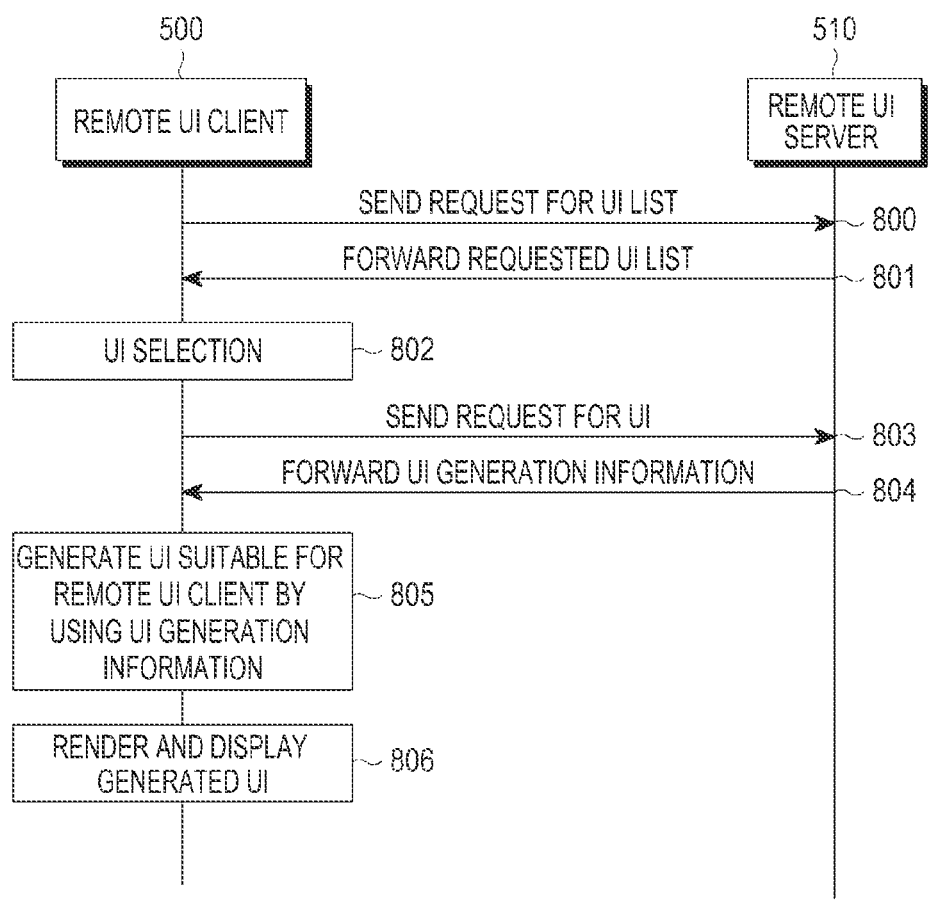
FIG. 8 is a signal flow diagram illustrating a UI providing process between the remote UI client and the remote UI server according to an embodiment of the present invention.

FIG. 8 is a signal flow diagram illustrating a UI providing process between the remote UI client 500 and the remote UI server 510 according to the second embodiment of the present invention.

In step 800, the remote UI client 500 sends a request for a UI list to the remote UI server 510. In step 801, the remote UI server 510 forwards the requested UI list to the remote UI client 500.

If there is a UI selection in step 802, the remote UI client 500 forwards a request for the selected UI to the remote UI server 510 in step 803. In step 804, the remote UI server 510 forwards a general-purpose UI including UI generation information used for UI generation to the remote UI client 500. In step 805, the remote UI client 500 generates a UI suitable for the remote UI client 500 by using the UI generation information included in the received general-purpose UI. In step 806, the remote UI client 500 renders and displays the generated UI.

In this way, in the present invention, the remote UI server performs capability matching once, such that data forwarded from the remote UI server may be simply configured, thereby reducing overhead between the remote UI client and the remote UI server and quickly providing the UI suitable for the apparatus.

Figure 9:
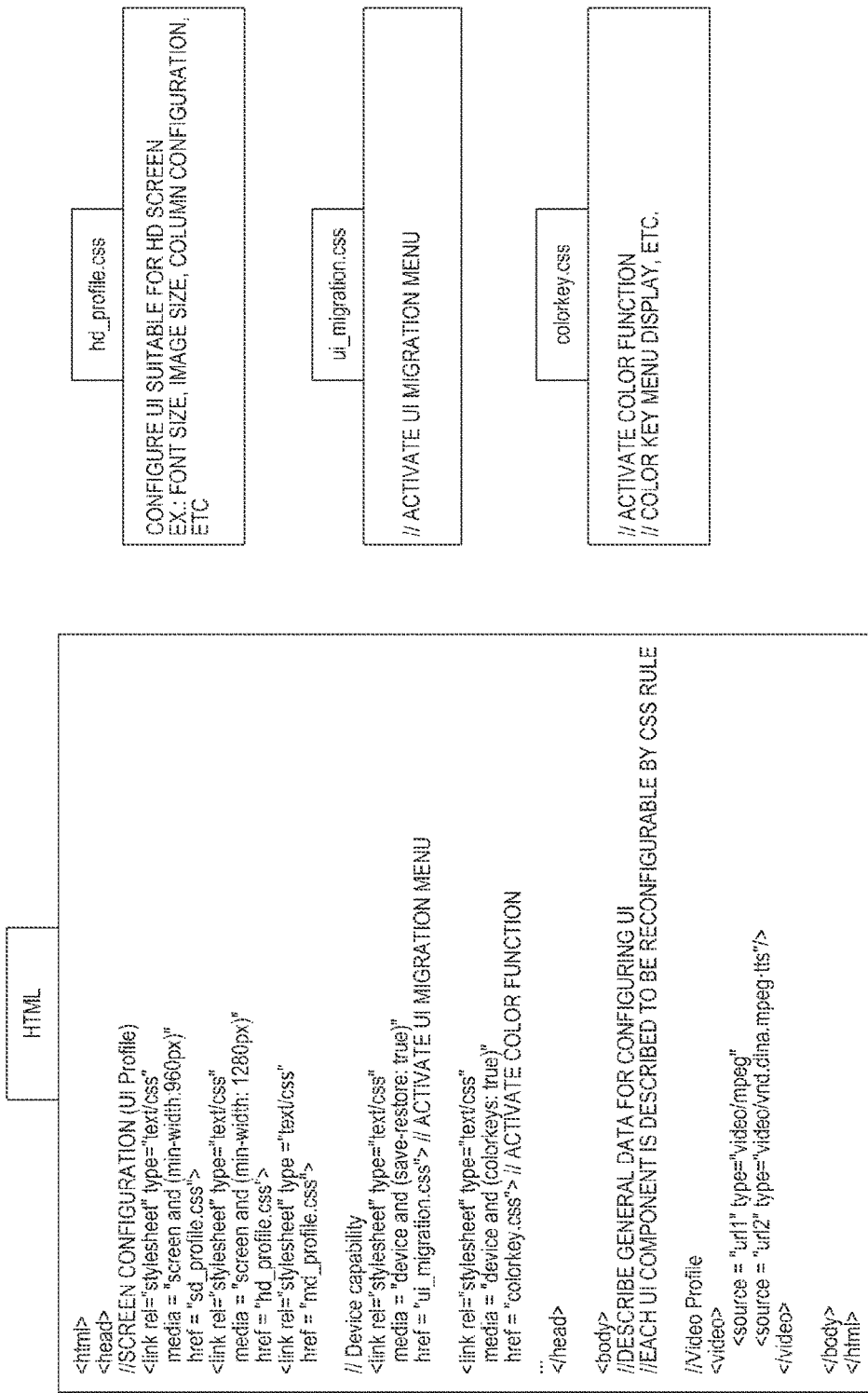
FIG. 9 illustrates a diagram of a general-purpose UI according to an embodiment of the present invention.

FIG. 9 illustrates a diagram of a general-purpose UI according to the second embodiment of the present invention.

Referring to FIG. 9, UI generation information of the general-purpose UI includes a HTML file and CSS files.

In the HTML file are described data of UI profile information, such as screen configuration, which is applicable to any apparatus and data of general UI configuration information, such as apparatus capability information, for configuring a UI, and the data are described to be reconfigurable by CSS rule information.

The CSS files include a CSS file (hd_profile.css) indicating rule information for UI configuration suitable for an HD screen, a CSS file (ui_migration.css) indicating rule information for UI migration menu activation, a CSS file (colorkey.css) indicating a UI profile such as rule information for color key menu activation, and a CSS file indicating CSS rule information which corresponds to characteristics between different apparatuses, such as apparatus capabilities. The CSS files may be generated as separate files as shown in FIG. 9 or may be generated as one file.

As is apparent from the forgoing description, the present invention may quickly provide a UI suitable for an apparatus while reducing the amount of data processed by a remote UI client or a remote UI server, and reducing overhead between the remote UI client and the remote UI server.

The present invention reduces overhead caused by repetitive transmission of a large amount of HTTP header each time a UI is requested. Moreover, the server does not need to keep profiles of various clients and a capability matching process of the server may be skipped, thus reducing overhead.

Furthermore, the present invention may provide a UI suitable for one or more apparatuses with one HTML.

While the present invention has been particularly shown and described with reference to certain embodiments thereof, various modifications or changes can be made without departing from the scope of the present invention. Therefore, the scope of the present invention is not limited to the disclosed embodiments, and it should be defined by the scope of the following claims and equivalents thereof.

What is claimed is:

1. An apparatus for providing a remote user interface (UI) comprising:
a display configured to display a UI; and
a processor configured to:
identify a first UI profile which includes a cascading style sheet (CSS) file indicating rule information for a high definition (HD) screen, a CSS file indicating rule information for a migration menu activation, a CSS file indicating rule information for color key menu activation, and a first video profile indicating an extension of video supported by the apparatus;
transmit a request for a first UI, the first UI profile, and the first video profile to a remote UI server;
receive, from the remote UI server, a first profile identification (ID) of the apparatus, and the first UI,
wherein the first profile ID of the apparatus is generated by the remote UI server based on the first UI profile, and the first video profile; and
control the display to display the received first UI,
wherein the processor is further configured to determine whether the first profile ID is valid for a second UI and transmit a request for the second UI, and the first profile ID to the remote UI server, if the first profile ID is determined as being valid for the second UI.

2. The apparatus of claim 1, wherein the processor is further configured to identify a second UI profile and a second video profile supported by the apparatus if the first profile ID is determined as not being valid for the request for the second UI.

3. The apparatus of claim 2, wherein the processor is further configured to transmit the request for the second UI, the second UI profile and the second video profile to the remote UI server, if the first profile ID is determined as not being valid for the request for the second UI.

4. A user interface (UI) providing method in an apparatus for providing a remote UI, the UI providing method comprising:
identifying a first UI profile, which includes a cascading style sheet (CSS) file indicating rule information for a high definition (HD) screen, a CSS file indicating rule information for a migration menu activation, a CSS file indicating rule information for color key menu activation, and a first video profile indicating an extension of video supported by the apparatus;
transmitting a request for a first UI, the first UI profile, and the first video profile to a remote UI server;
receiving, from the remote UI server, a first profile identification (ID) of the apparatus, the first UI profile, the first video profile, and the first UI, wherein the first profile ID is generated by the remote UI server based on the first UI profile, and the first video profile;
displaying the received first UI;
determining whether the first profile ID is valid for a second UI; and
transmitting a request for the second UI and the first profile ID to the remote UI server, if the first profile ID is determined as being valid for the request for the second UI.

5. The UI providing method of claim 4, further comprising:

identifying a second UI profile and a second video profile supported by the apparatus if the first profile ID is determined as not being valid for the request for the second UI; and transmitting the request for the second UI, the second UI profile, and the second video profile to the remote UI server if the first profile ID is determined as not being valid for the request for the second UI.

6. The apparatus of claim 1, wherein the first profile ID is temporary string information of the apparatus.

* * * * *